United States Patent [19]

Krüger et al.

[11] Patent Number: 4,469,957
[45] Date of Patent: Sep. 4, 1984

[54] RESETTING CIRCUIT FOR MICROPROCESSORS

[75] Inventors: Tilmann Krüger, Neunkirchen; Heinz Effenberger, Herpersdorf, both of Fed. Rep. of Germany

[73] Assignee: Diehl GmbH & Co., Fed. Rep. of Germany

[21] Appl. No.: 339,874

[22] Filed: Jan. 18, 1982

[30] Foreign Application Priority Data

Feb. 3, 1981 [DE] Fed. Rep. of Germany ....... 3103489

[51] Int. Cl.$^3$ ............................................ H02H 11/00
[52] U.S. Cl. ................................ 307/200 A; 307/290; 307/297
[58] Field of Search ............... 307/200 A, 290, 247 R, 307/297

[56] References Cited

U.S. PATENT DOCUMENTS

| | | | |
|---|---|---|---|
| 4,099,068 | 7/1978 | Kobayashi et al. | 307/200 A |
| 4,232,236 | 11/1980 | Yomugida et al. | 307/200 A |
| 4,266,145 | 5/1981 | Amacher et al. | 307/200 A |
| 4,322,634 | 3/1982 | Kaire et al. | 307/200 A |

OTHER PUBLICATIONS

*Pulse, Digital and Switching Waveforms*, by Millman & Taub, pp. 392, 393, copyright 1965, McGraw-Hill Book Co.

*Primary Examiner*—John S. Heyman
*Attorney, Agent, or Firm*—Scully, Scott, Murphy & Presser

[57] ABSTRACT

A resetting circuit for microprocessors which facilitates the operation of a microprocessor even with extensively disrupted supply voltages. For this purpose, in a voltage stabilization circuit for supplying a microprocessor there is monitored the voltage difference between the supply voltage and the operating voltage through a potential difference-controlled flip-flop. This flip-flop generates a resetting signal when the supply voltage has approached its minimum permissible value, in effect, is therebelow. Upon the subsequent rise of the supply voltage, the resetting signal is maintained until there is again reached a predeterminable percentage of the rated value of the supply voltage.

2 Claims, 3 Drawing Figures

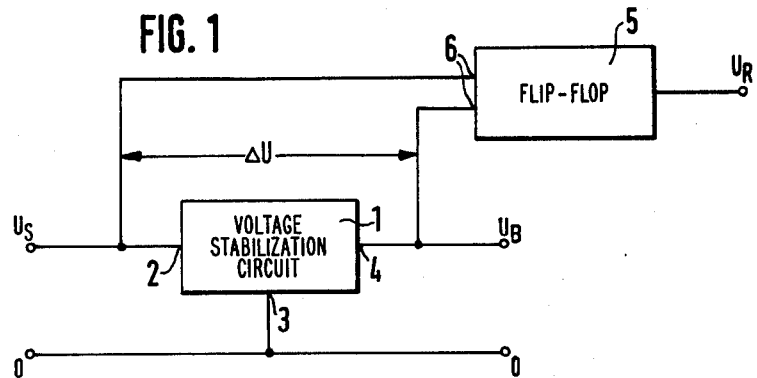
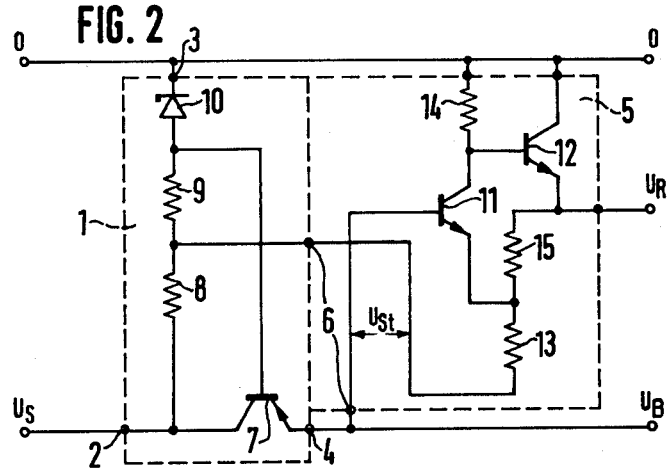
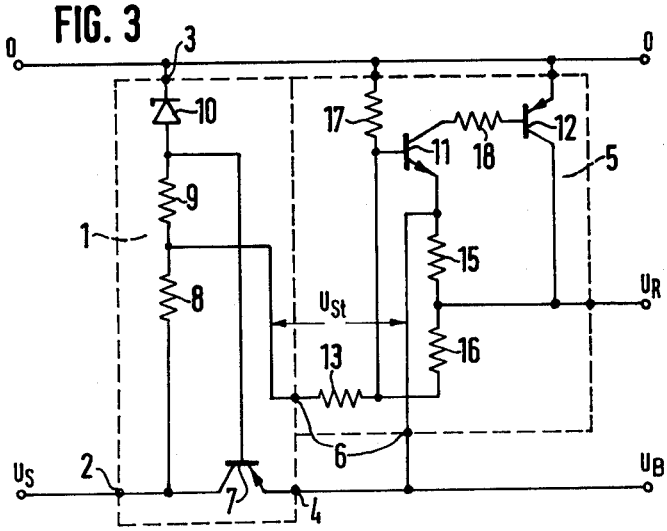

RESETTING CIRCUIT FOR MICROPROCESSORS

BACKGROUND OF THE INVENTION

1. Field of the Invention

The present invention relates to a resetting circuit for microprocessors for the generation of reset signals in dependence upon an operating voltage conducted to the microprocessor, which is supplied by the operating voltage and includes a stabilization circuit for the reduction of a supply voltage to a constant operating voltage.

2. Discussion of the Prior Art

Resetting circuits of that type have become known, for example, from German Published patent application No. 29 36 683. In that publication, FIG. 2 illustrates the known reset circuit which has its output connected to the reset input of a microprocessor. This reset circuit produces a reference voltage from the operating voltage at a compensating resistance which is formed by the combination of a zener diode and a series resistance connected in series, and which is connected in parallel with the operating voltage source. When this reference voltage falls below a predetermined value, there is then generated a reset signal for the microprocessor by means of a two-step switching amplifier. At the repeated rise of the operating voltage, through a resistor-condensor combination connected to the output of the switching amplifier there is delayed the clearing of the microprocessor for a predetermined time interval.

In this circuit arrangement, at lengthier enduring operating voltage fluctuations, the microprocessor will also be released when the operating voltage does not reach its normal value, so that the microprocessor is cleared for only a short period and is always again reset. Furthermore, at short operating voltage disruptions there is obtained a disadvantageous delay in the clearing of the microprocessor. Moreover, the integrateability of that type of arrangement is rendered more difficult through the presence of a condenser which, under circumstances, is of a higher capacitance.

SUMMARY OF THE INVENTION

Accordingly, it is an object of the present invention to provide a resetting circuit which, at lengthier continuing operating voltage oscillations, will reliably maintain the microprocessor in the reset condition, and will only then again release when there is assuredly reached a condition of operational preparedness. Furthermore, at short operating voltage oscillations, a clearing of the microprocess should be achieved with the least possible delay after reachievement of the operating voltage. Finally, this resetting circuit can be constructed with a minimum requirement of components and, especially can also be integrateable.

The foregoing object is achieved with a resetting circuit as described hereinabove in which a flip-flop or oscillator which delivers the reset signal is controlled through a control voltage which is proportional to the differential voltage between the supply voltage and the operating voltage, in which the flip-flop evidences a hysteresis between the switching points for a rising and dropping control voltage, wherein the flip-flop is actuated when the differential voltage corresponds to approximately the difference between the operating voltage and a minimum permissible supply voltage, and in which the flip-flop is set back when the supply voltage has again reached a predeterminable percentage of its rated value.

Attained in accordance therewith, in an advantageous manner, are capabilities for the utilization of a microprocessor with even more extensively disrupted operating voltage sources.

In further preferred embodiments of the invention, in an advantageous manner there is obtained a minimum requirement for essential components, as well as due to an absence of capacitances, an easy integrateability.

BRIEF DESCRIPTION OF THE DRAWINGS

Reference may now be had to the following detailed description of preferred embodiments of the invention, taken in conjunction with the accompanying drawings; in which:

FIG. 1 illustrates the basic circuit diagram of the inventive resetting circuit for microprocessors;

FIG. 2 illustrates a preferred embodiment of a resetting circuit for the generating of an inverse reset command; and FIG. 3 illustrates another preferred embodiment of the resetting circuit.

DETAILED DESCRIPTION

FIG. 1 illustrates the principle of the circuit arrangement for the resetting of a microprocessor at predetermined disruptions in the voltage supply. A usual circuit for voltage stabilization 1, in which three connections lead out, has one input 2 and one reference voltage connection 3 connected, respectively, a supply voltage $U_S$ and to a reference voltage 0, and generates a stabilized perating voltage $U_B$ between an output 4 and the reference voltage connection 3. A potential difference-controlled flip-flop 5 is supplied with a control voltage $U_{St}$ which is proportional to the voltage difference $\Delta U$ between the supply voltage $U_S$ and the operating voltage $U_B$. In FIG. 1, for reasons of simplicity, the voltage differential $\Delta U$ is directly tapped off between the input 2 and the output of the stabilization circuit 1. The flip-flop 5, at the presence of predetermined voltage relationships, now delivers at its control input 6 a reset signal $U_R$ for a microprocessor.

It is known that with the rise, or respectively the rerise of the operating voltage $U_B$ of a microprocessor, different circuit components thereof must be brought into a definite output condition. This is achieved in that at the reset input of the microprocess, in accordance with the internal circuitry thereof, there is applied a Low or High signal. This resetting is also necessary when the operating voltage $U_B$ of the microprocessor drops below a predetermined tolerance value and thereafter again rises.

The operating voltage $U_B$ of a microprocessor is in general produced from a higher supply voltage $U_S$, which is stabilized and lowered to the value of the operating voltage $U_B$. This already signifies a security against fluctuations of the supply voltage $U_S$ within a predetermined range. However, if the supply voltage $U_S$ drops below its minimum permissible value, so that at the output 4 the stabilization circuit 1 can no longer maintain the operating voltage $U_B$, it is then necessary to protect the microprocessor from erroneous functions through the measure of additional circuitry.

The foregoing should be achieved through the present invention in that, by means of the differential voltage $\Delta U$ between the input 2 and the output 4 of the voltage stabilization circuit 1, or a control voltage $U_{St}$ which is proportional thereto, there is actuated the flip-flop 5, which generates a reset signal as soon as the supply voltage $U_S$ has dropped below the minimum permissible value.

When the supply voltage $U_S$ fluctuates over a lengthier time interval about its minimum permissible value, in order to prevent the microprocessor from being cleared at each repeated rise in the supply voltage $U_S$ above the minimum permissible value for a short period, by means of the resetting circuit, the microprocessor is only again cleared when the supply voltage $U_S$ has neared its rated value. This is achieved in that the flip-flop 5 includes a hysteresis at its input to between the switching points for the rising and dropping control voltage. A circuit arrangement which is suitable for the flip-flop 5 is, for example, the known Schmitt-trigger circuit.

A problem encountered in the arrangement of that type of flip-flop with hystereses between the switching points lies in that these must also still be functional at essentially lower voltages than the normal operating voltage $U_B$, in effect there must be generated a reset signal $U_R$ for as long as the supply voltage is present at the microprocessor is still so high as to render possible any kind of uncontrolled switching sequences.

The foregoing is achieved, as is illustrated in FIGS. 2 and 3 of the drawings, by a preferred circuit arrangement within the context of the invention.

FIG. 2 illustrates a generally known voltage stabilization circuit 1 which is connected with a flip-flop 5. The voltage stabilization circuit 1 incorporates a regulating transistor 7 which, in a known manner, is connected as an emitter-follower. The reference voltage for the control of the base of the regulating transistor 7 is obtained through a series circuit formed of resistors 8, 9 and a diode 10, wherein the same series circuit is connected between the supply voltage $U_S$ and the reference voltage 0, and the base of the regulating transistor 7 is connected with a pick-up between the zener diode 10 and the resistor 9 of the series circuit.

The flip-flop 5 is built in two stages from an input transistor 11 and a switching transistor 12. Herein, the base of the input transistor 11 is connected with the output 4 of the voltage stabilization circuit 1, in effect, with the operating voltage $U_B$. The emitter of the same input transistor 11 is conducted through an input resistor 13 to a pick-up of the voltage divider 8, 9, 10, wherein the pick-up is located between the resistors 8 and 9. Thereby, at the input 6 of the flip-flop there is applied a control voltage $U_{St}$ which is proportional to the voltage differential $\Delta U$ between the supply voltage $U_S$ and the operating voltage $U_B$, in effect, proportional to the differential voltage $\Delta U$ between the input 2 and the output 3 of the voltage stabilization circuit 1.

The collector of the input transistor 11 is connected through a collector resistor 14 with the reference voltage 0 of the operating voltage $U_B$, in essence, with the supply voltage $U_S$, as well as with the base of the switching transistor 12. The emitter of the input transistor 11, furthermore, is connected through a coupling resistor 15 with the emitter of the switching transistor 12. The collector of the switching transistor 12 is applied directly to the reference voltage 0.

The reset signal $U_R$ occurs between the emitter and the collector of the switching transistor 12. During normal operation, in effect, at a sufficiently high supply voltage $U_S$, the switching transistor 12 is blocked and the input transistor 11 is conductive. When the control voltage $U_{St}$ drops to a sufficient extent, in effect approaches the supply voltage $U_S$, or drops below its minimum permissible value, then the input transistor 11 is blocked and the switching transistor 12 is actuated. This condition will be maintained up to extremely low values of the supply voltage $U_S$. When the supply voltage $U_S$ again rises above its minimum permissible value, then the input transistor 11 remains blocked and the switching transistor 12 conductive until the supply voltage $U_S$ has reached a percentage of its rated value, which is predetermined by the dimensioning of the circuit. This hysteresis is predicated upon the coupling resistor 15 which, with the switching transistor 12 actuated, cooperates with the series resistor 13 to form a voltage divider for the precharging of the emitter of the input transistor 11.

This upper tolerance threshold can be preset within an extremely wide range through the selection of suitable values for the resistors 13 and 15, in effect, can be adjusted through the utilization of variable resistors. Preferably, this tolerance threshold approaches the rated value of the supply voltage $U_S$, for example, 90 to 95% thereof.

The reset signal $U_R$ which is generated between the collector and the emitter of the switching transistor 12, is inverted in the above-described circuit as described below:

With a blocked switching transistor 12; in effect, during the normal operating condition, a higher voltage is present between the collector and the emitter, thus there is logic One; at the conductive switching transistor 12, when in essence there should be formed the reset command, a logic Zero.

FIG. 3 illustrates a further preferred embodiment of the invention, wherein the voltage stabilization circuit 1 is identical with that in FIG. 2.

The flip-flop 5 is built in two stages from an input transistor 11 and a switching transistor 12, which are complementary to each other. The emitter of the input transistor 11 is directly connected with the operating voltage $U_B$, and the base through an input resistor 13 with the pick-up of the voltage divider between the resistors 8 and 9. These two conductors act as the input 6 of the flip-flop 5 and are supplied with a control voltage $U_{St}$ which is proportional to the differential voltage $\Delta U$ between the supply voltage $U_S$ and the operating voltage $U_B$. Furthermore, the base of the input transistor 11 is connected through a base resistor 17 with the reference voltage 0. The collector of the input transistor 11 is connected through a series resistor 18 with the base of the switching transistor 12. The emitter of the switching transistor 12 is connected with the reference voltage 0, whereas the collector is connected through coupling resistors 15 and 16 with the emitter and the base of the input transistor 11. The reset signal $U_R$ is formed between the emitter and the collector of the switching transistor 12. During normal operation, in effect, at a sufficiently high supply voltage $U_S$, the input transistor 11 as well as the switching transistor 12 are in the conductive condition. When the control voltage $U_{St}$ drops to a predetermined value, which is indicated when the supply voltage $U_S$ has approximately reached its minimum permissible value or has dropped therebelow, then the input transistor 11, and resultingly also the switching transistor 12, will switch into the non-conductive condition. This condition is maintained, just as in FIG. 2, up to extremely low values of the supply voltage $U_S$. At a repeated rise in the supply voltage $U_S$ above its minimum permissible value, the input transistor 11 as well as switching transistor 12 remain blocked until the supply voltage $U_S$ has again reached its rated value up to a level which is predetermined by the relationship of the resistors 15, 16 and 17. The sizing of this switching hysteresis, with the other circuit parameters being fixed, becomes possible in a simple manner through a variation of the coupling resistor 16.

As already can be ascertained from the above description, the switching transistor 12 operates in a conductive condition during normal operation, in effect, the reset signal $U_R$ which appears between the emitter and collector of the switch transistor 12 represents a logic Zero, whereas at a dropoff of the supply voltage $U_S$ to below its minimum permissible value, the switch transistor 12 is blocked, and thereby a higher voltage will be present between the emitter and collector. Thus as the reset command is generated a logic One.

What is claimed is:

1. In a resetting circuit for microprocessors for the formation of reset signals in dependence upon an operating voltage conducted to the microprocessor which is supplied by the operating voltage; and said circuit including a stabilization circuit for the reduction of a supply voltage to a constant operating voltage; the improvement comprising: a flip-flop for delivering the reset signal; means for applying a control voltage to said flip-flop, said control voltage being proportional to the differential voltage between the supply voltage and the operating voltage; said flip-flop including a hysteresis between switching points for a rising and reducing control voltage; means actuating said flip-flop when the differential voltage generally corresponds to the difference between the operating voltage and a minimum permissible supply voltage; said flip-flop being reset when the supply voltage has again reached a predeterminable percentage of its rated value, said flip-flop comprising a plurality of transistor stages, including an input transistor controlled by said control voltage, and a switching transistor coupled with said input transistor whereby, in response to a change in the switching condition of the input transistor, said switching transistor changes is switched condition and wherein said second change displaces the operating point of said input transistor, and the base of said input transistor is connected with the operating voltage output of the voltage stabilization circuit, and a voltage divider having a first pick-up connected with said flip-flop input, said pick-up being switchable between the supply voltage and a reference voltage, and the collector of said input transistor being connected through a collector resistor with the reference voltage, the emitter of said input transistor being conducted through an emitter resistor to the first pick-up of the voltage divider, the emitter of the switching transistor being connected through a coupling resistor with the emitter of the input transistor, the base of the switching transistor being connected between the collector of the input transistor and the collector resistor thereof, the collector of the switching transistor being connected with the reference voltage, and the resetting signal appearing between the collector and emitter of the switching transistor.

2. In a resetting circuit for microprocessors for the formation of reset signals in dependence upon an operating voltage conducted to the microprocessor which is supplied by the operating voltage; and said circuit including a stabilization circuit for the reduction of a supply voltage to a constant operating voltage; the improvement comprising: a flip-flop for delivering the reset signal; means for applying a control voltage to said flip-flop, said control voltage being proportional to the differential voltage between the supply voltage and the operating voltage; said flip-flop including a hysteresis between switching points for a rising and reducing control voltage; means actuating said flip-flop when the differential voltage generally corresponds to the difference between the operating voltage and a minimum permissible supply voltage; said flip-flop being reset when the supply voltage has again reached a predeterminable percentage of its rated value, said flip-flop comprising a plurality of transistor stages, including an input transistor controlled by said control voltage, and a switching transistor coupled with said input transistor whereby, in response to a change in the switching condition of the input transistor, said switching trnasistor changes its switched condition and wherein said second change displaces the operating point of said input transistor, said input transistor and said switching transistor being mutually complementary, the emitter of the input transistor being connected with the operating voltage output of the voltage stabilization circuit, and a voltage divider having a first pick-up connected with said flip-flop input, said pick-up being switchable between the supply voltage and a reference voltage, and the base of the input transistor being connected through a base resistor with the reference voltage, and through an input resistor with the first pick-up of the voltage divider, the base of the switching resistor being connected through a series resistor with the collector of the input transistor and the emitter of the switching transistor with the reference voltage, the collector of the switching transistor being connected through coupling resistors with the base and the emitter of said input transistor, and said resetting signal appearing between the emitter and the collector of the switching transistor.

* * * * *